US006859168B2

(12) United States Patent  (10) Patent No.: US 6,859,168 B2
Isaji  (45) Date of Patent: Feb. 22, 2005

(54) RADAR APPARATUS

(75) Inventor: Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/757,559

(22) Filed: Jan. 14, 2004

(65) Prior Publication Data

US 2004/0207552 A1 Oct. 21, 2004

(30) Foreign Application Priority Data

Apr. 3, 2003 (JP) .......................... 2003-100299

(51) Int. Cl.⁷ .............................................. G01S 13/34
(52) U.S. Cl. ..................... 342/128; 342/107; 342/109; 342/374
(58) Field of Search ........................ 342/74, 89, 109, 342/116, 117, 128, 158, 374, 107

(56) References Cited

U.S. PATENT DOCUMENTS

| 4,184,154 A | * | 1/1980 | Albanese et al. ........... 342/128 |
| 5,955,991 A |   | 9/1999 | Kawakubo |
| 6,445,339 B1 | * | 9/2002 | Yamada ....................... 342/374 |
| 6,573,859 B2 | * | 6/2003 | Tokoro ......................... 342/128 |
| 2004/0164892 A1 | * | 8/2004 | Shinoda et al. ............. 342/107 |

FOREIGN PATENT DOCUMENTS

| EP | 0 919 828 A2 | 6/1999 |
| EP | 1 076 244 A1 | 2/2001 |
| JP | 11-160423 | 6/1999 |

OTHER PUBLICATIONS

Search Report of Corresponding European Application No. 04251455.4, dated Jul. 15, 2004.

* cited by examiner

*Primary Examiner*—Ian J. Lobo
(74) *Attorney, Agent, or Firm*—Christie, Parker and Hale, LLP (57) ABSTRACT

Disclosed is a radar apparatus which receives a transmitted signal reflected from an object by switching between a plurality of antennas, wherein the plurality of antennas are divided into a plurality of groups, and at least one of the plurality of antennas contained in each of the groups is a common antenna. The radar apparatus comprises: a selector switch section having a plurality of selector switches each for sequentially and selectively switching output terminals of the plurality of antennas and the common antenna contained in a corresponding one of the groups for connection to an input terminal; a plurality of channels each having an A/D converter and a downconverting section for downconverting a received signal that has been input from each of the antennas to the input terminal via a corresponding one of the plurality of selector switches; and a digital signal processing section for receiving an output from the A/D converter of each of the channels, wherein the digital signal processing section applies prescribed processing to detect the distance to or the relative velocity of the object.

4 Claims, 10 Drawing Sheets

PRIOR ART

RECEIVER SECTION (A)
RECEIVER SECTION (B)
RECEIVER SECTION (C)

SWITCHING FOR THE CASE WHERE
CORRECTIONS ARE APPLIED

Fig.11B

RECEIVER SECTION (A)
RECEIVER SECTION (B)
RECEIVER SECTION (C)

SWITCHING FOR THE CASE WHERE
CORRECTIONS ARE NOT APPLIED

RADAR APPARATUS

Applicant claims the right to priority based on Japanese Patent Application No. 2003-100299, filed Apr. 3, 2003.

BACKGROUND OF THE INVENTION

1. Field of the Invention

The present invention relates to an FM-CW radar apparatus that uses a frequency-modulated (FM) continuous wave (CW) as a signal for transmission and, more particularly, to a DBF radar apparatus that performs digital beam forming.

2. Description of the Related Art

A conventional DBF radar apparatus comprises: a transmitter section for radiating an electromagnetic wave as a transmit signal; an array antenna comprising a plurality of antenna elements for receiving, as a received signal, the electromagnetic wave reflected by an object; a plurality of input terminals connected to the respective antenna elements; an output terminal which is selectively connected by a switching means to one of the plurality of input terminals; and a receiver section in which the received signal obtained from the output terminal is downconverted by using a portion of the transmitted signal and the resulting difference signal representing the difference between the transmitted signal and the received signal is converted into a digital signal, wherein the distance to or the relative velocity of the object is detected by applying prescribed processing to the digital signal obtained from the receiver section (refer, for example, to Publication of Japanese Unexamined Patent Application No. 11-160423).

SUMMARY OF THE INVENTION

It is an object of the present invention to provide a DBF radar apparatus that can accomplish highly accurate measurements.

According to the radar apparatus of the present invention, a plurality of antennas are divided into a plurality of groups, while setting at least one of the plurality of antennas as a common antenna, and the apparatus includes a plurality of selector switches each for sequentially and selectively switching output terminals of the plurality of antennas and the common antenna contained in a corresponding one of the groups for connection to an input terminal. The apparatus further includes a plurality of channels each having an A/D converter and a downconverting section for downconverting a received signal by using a portion of a transmitted signal, that is, the received signal that has been input from each of the antennas to the input terminal is downconverted and A/D converted in a corresponding one of the plurality of channels, and prescribed processing is applied in a digital signal processing section to detect the distance to or the relative velocity of the object.

According to the present invention, as at least one of the plurality of antennas is shared between the plurality of channels, highly accurate measurements can be accomplished by applying corrections.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the radar apparatus of the present invention, the principle of FM-CW radar and the principle of DBF radar will be described.

An FM-CW radar measures the distance to a target object, such as a vehicle traveling ahead, by transmitting a continuous wave frequency-modulated, for example, in a triangular pattern. More specifically, the transmitted wave from the radar is reflected by the vehicle ahead, and the reflected signal is received and mixed with the transmitted signal to produce a beat signal (radar signal). This beat signal is fast Fourier transformed to analyze the frequency. The frequency-analyzed beat signal exhibits a peak at which power becomes large in correspondence with the target. The frequency corresponding to this peak is called the peak frequency. The peak frequency carries information about distance, and the peak frequency differs between the rising portion and falling portion of the triangular FM-CW wave due to the Doppler effect associated with the relative velocity with respect to the vehicle ahead. The distance and relative velocity with respect to the vehicle ahead are obtained from the peak frequencies in the rising and falling portions. If there are more than one vehicle traveling ahead, a pair of peak frequencies in the rising and falling portions is generated for each vehicle. Forming pairs of peak frequencies in the rising and falling portions is called pairing.

Figure 1A:
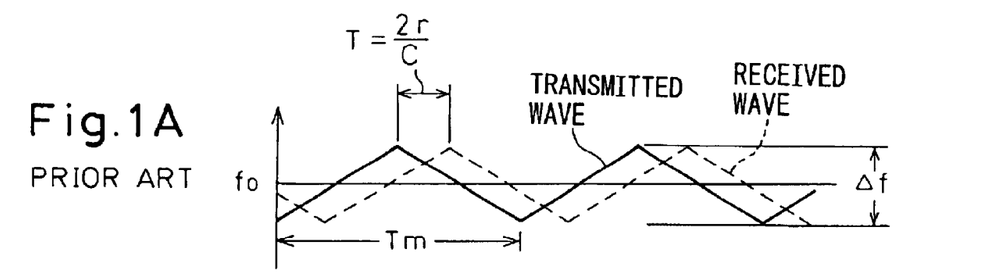
FIGS. 1A, 1B, and 1C are diagrams for explaining the principle of FM-CW radar when the relative velocity with respect to target is 0.
Figure 1B:
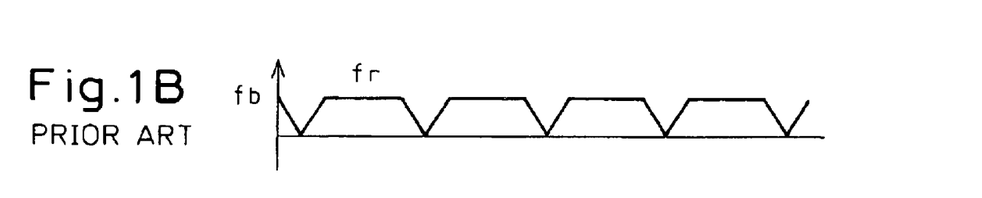
Figure 1C:
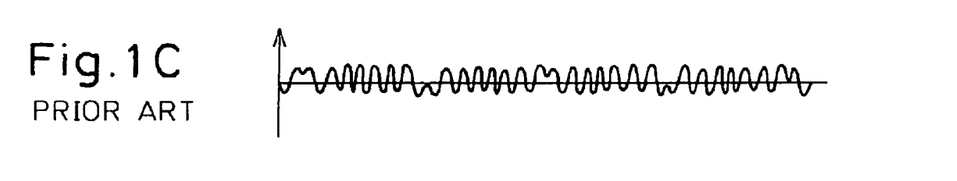

FIGS. 1A, 1B, and 1C are diagrams for explaining the principle of the FM-CW radar when the relative velocity with respect to the target is 0. The transmitted wave is a triangular wave whose frequency changes as shown by a solid line in FIG. 1A. In the figure, f0 is the center frequency of the transmitted wave, $\Delta f$ is the FM modulation width, and Tm is the repetition period. The transmitted wave is reflected from the target and received by an antenna; the received wave is shown by a dashed line in FIG. 1A. The round trip time T to and from the target is given by T=2r/C, where r is the distance (range) to the target and C is the velocity of radio wave propagation.

Here, the received wave is shifted in frequency from the transmitted signal (i.e., produces a beat) according to the distance between the radar and the target.

The frequency component fb of the beat signal can be expressed by the following equation.

$$fb = fr = (4 \cdot \Delta f / C \cdot Tm) r$$

where fr is the frequency due to the range (distance).

Figure 2A:
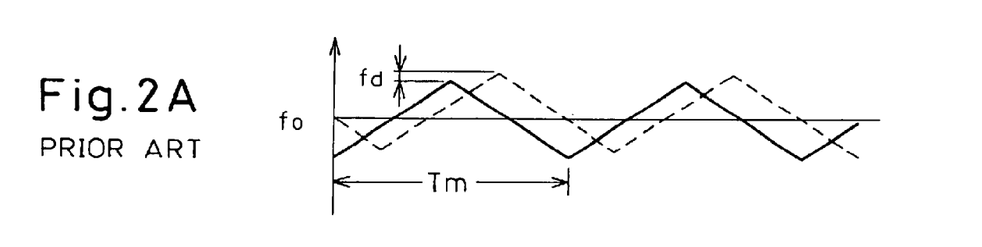
FIGS. 2A, 2B, and 2C are diagrams for explaining the principle of FM-CW radar when the relative velocity with respect to target is v.
Figure 2B:
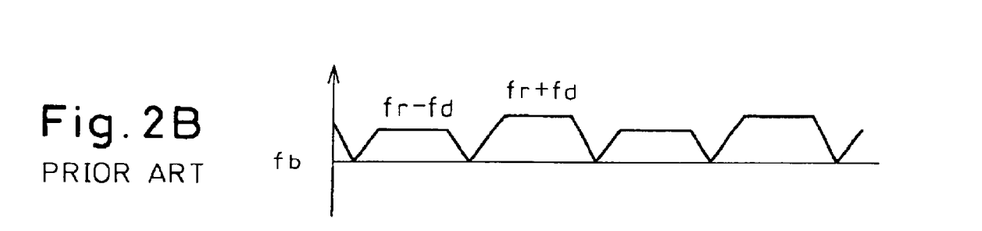
Figure 2C:
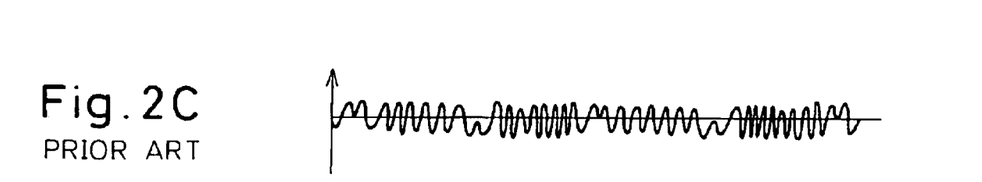

FIGS. 2A, 2B, and 2C, on the other hand, are diagrams for explaining the principle of the FM-CW radar when the relative velocity with respect to the target is v. The frequency of the transmitted wave changes as shown by a solid line in FIG. 2A. The transmitted wave is reflected from the target and received by the antenna; the received wave is shown by a dashed line in FIG. 2A. Here, the received wave is shifted in frequency from the transmitted signal (i.e., produces a beat) according to the distance between the radar and the target. In this case, as the relative velocity with respect to the target is v, a Doppler shift occurs, and the beat frequency component fb can be expressed by the following equation.

$$fb = fr \pm fd = (4 \cdot \Delta f / C \cdot Tm) r \pm (2 \cdot f0 / C) v$$

where fr is the frequency due to the distance, and fd is the frequency due to the velocity.

Figure 3:
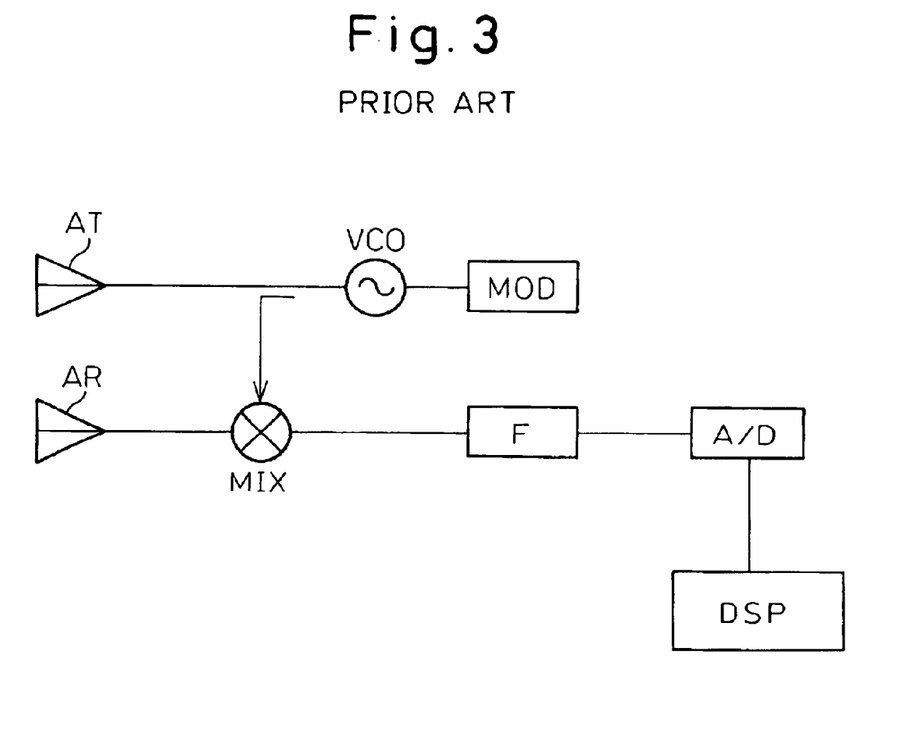
FIG. 3 is a diagram showing one configuration example of the FM-CW radar.

The symbols in the above equation have the following meanings.
fb: Transmit beat frequency
fr: Range (distance) frequency
fd: Velocity frequency
f0: Center frequency of transmitted wave
$\Delta f$: Frequency modulation width
Tm: Period of modulation wave
C: Velocity of light (velocity of radio wave)
T: Round trip time of radio wave to and from target object
r: Range (distance) to target object
v: Relative velocity with respect to target object FIG. 3 is a diagram showing one configuration example of the FM-CW radar. As shown, a modulating signal generator MOD applies a modulating signal to a voltage-controlled oscillator VCO for frequency modulation, and the frequency-modulated wave is transmitted out from a transmitting antenna AT, while a portion of the transmitted signal is separated and fed into a mixer MIX. The signal reflected from the target is received by a receiving antenna AR, and the received signal is mixed in the mixer MIX with the output signal of the voltage-controlled oscillator VCO to produce a beat signal. The beat signal is passed through a filter F, and is converted by an A/D converter into a digital signal; the digital signal is then supplied to a digital signal processor DSP where signal processing, such as a fast Fourier transform, is applied to the digital signal to obtain the distance and the relative velocity.

Digital beam forming is a technology in which signals received by an array antenna with a plurality of receiving antennas are each A/D converted and fed to a digital signal processing section and adjustments of beam scanning and sidelobe characteristics, etc. are made in the digital signal processing section.

Figure 4:
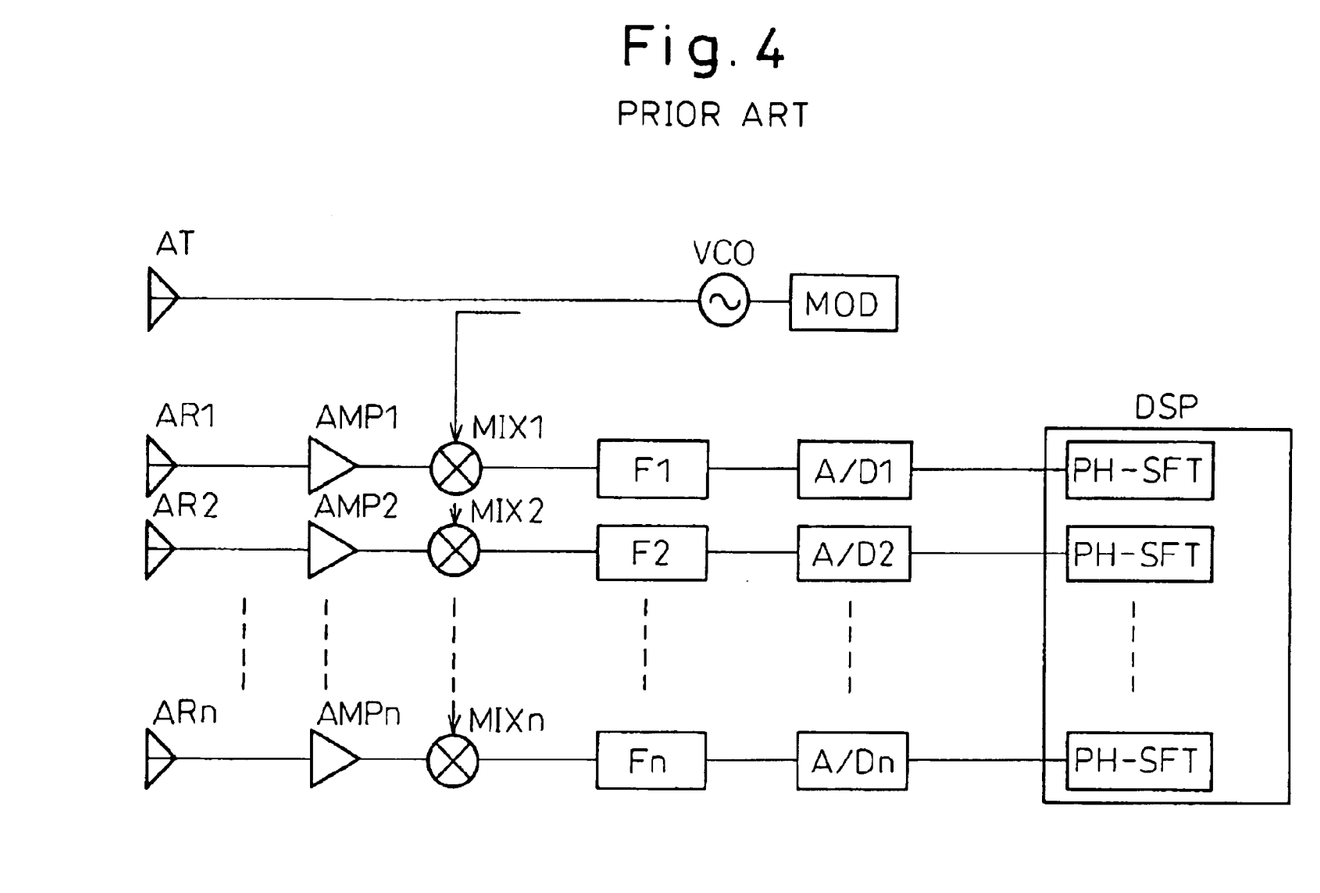
FIG. 4 is a diagram showing the basic configuration of a digital beam forming (DBF) radar.

A DBF radar accomplishes the function of phase shifters in a phased-array antenna radar by digital signal processing; the basic configuration of the DBF radar is shown in FIG. 4.

As shown, a modulating signal generator MOD applies a modulating signal to a voltage-controlled oscillator VCO for frequency modulation, and the frequency-modulated wave is transmitted out from a transmitting antenna AT, while a portion of the transmitted signal is separated and fed into a plurality of mixers MIX1 to MIXn. Signals reflected from objects are received by a plurality of receiving antennas AR1 to ARn, and the received signals from the respective receiving antennas are fed via respective amplifiers AMP1 to AMPn into the respective mixers MIX1 to MIXn where the received signals are each mixed with the output signal of the voltage-controlled oscillator VCO to produce beat signals.

The beat signals thus produced are passed through respective filters F1 to Fn and are converted by respective A/D converters A/D1 to A/Dn into digital signals which are supplied to a digital signal processor DSP. In the DSP, phase shifting (PH-SFT) is applied to the digital signal from each channel, and all the channels are combined.

The feature of DBF is that a plurality of beams can be created in a single acquisition process because, once the signals from all the receiving antennas are taken in as digital signals, the beam can be synthesized in any desired direction based on the digital signals.

On the other hand, Publication of Japanese Unexamined Patent Application No. 11-160423 discloses a DBF radar apparatus in which one amplifier, mixer, filter, etc., provided for each antenna in the DBF radar apparatus shown in FIG. 4, are consolidated into one. To make understanding of the present invention easy, such a radar apparatus will be explained with reference to FIG. 5.

Figure 5:
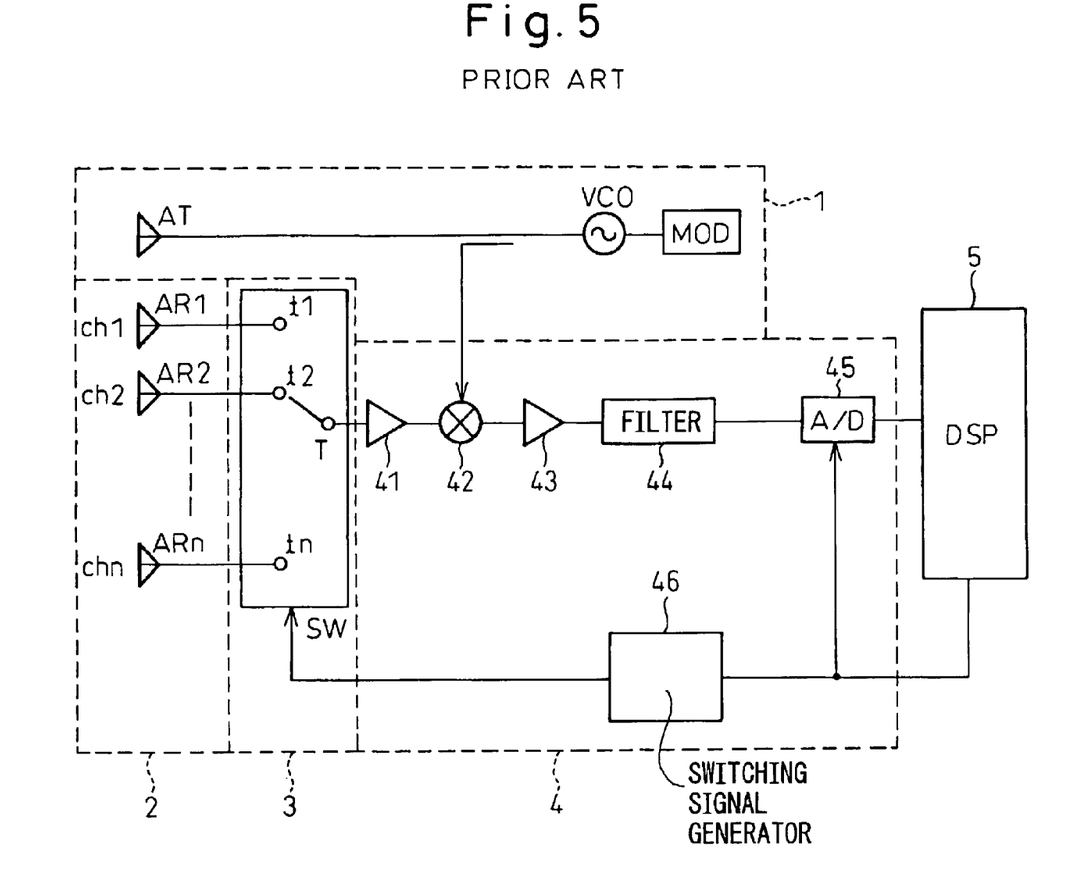
FIG. 5 is a diagram showing a modified example of the digital beam forming (DBF) radar.

In FIG. 5, reference numeral 1 is a transmitter section, 2 is an antenna section, 3 is a selector switch section, 4 is a receiver section, and 5 is a digital signal processing section. In the transmitter section 1, the modulating signal generator MOD applies a modulating signal to the voltage-controlled oscillator VCO for frequency modulation, and the frequency-modulated wave of $f0 \pm \Delta f/2$ is transmitted out from the transmitting antenna AT, while a portion of the transmitted signal is separated and fed into a mixer 42 in the receiver section 4. Signals reflected from objects are received by the plurality of receiving antennas AR1 to ARn in the antenna section 2, and the received signals from the respective receiving antennas are fed via the selector switch section 3 into the receiver section 4.

The receiving antennas comprise n receiving antennas AR1 to ARn corresponding to the first channel ch1 to the nth channel chn. The selector switch section 3 comprises n terminal outputs t1 to tn corresponding to the n antennas and one input terminal T which is connected to one of the terminals t1 to tn, the connection being switched cyclically by a switching signal supplied from a switching signal generator 46. The signals received by the receiving antennas are each amplified by an amplifier 41 and mixed in the mixer 42 with a portion of the transmitted signal. With this mixing, the received signal is downconverted to produce a beat signal which is the difference between the transmitted signal and the received signal. The beat signal is then passed through an amplifier 43 and a filter 44 and input to an A/D converter 45 where it is converted into a digital signal in synchronism with the timing of the switching signal output from the switching signal generator 46. The digital signal processing section (DSP) 5 performs digital beam forming by taking the digital beat signal from the A/D converter 45 as an input.

Figure 6:
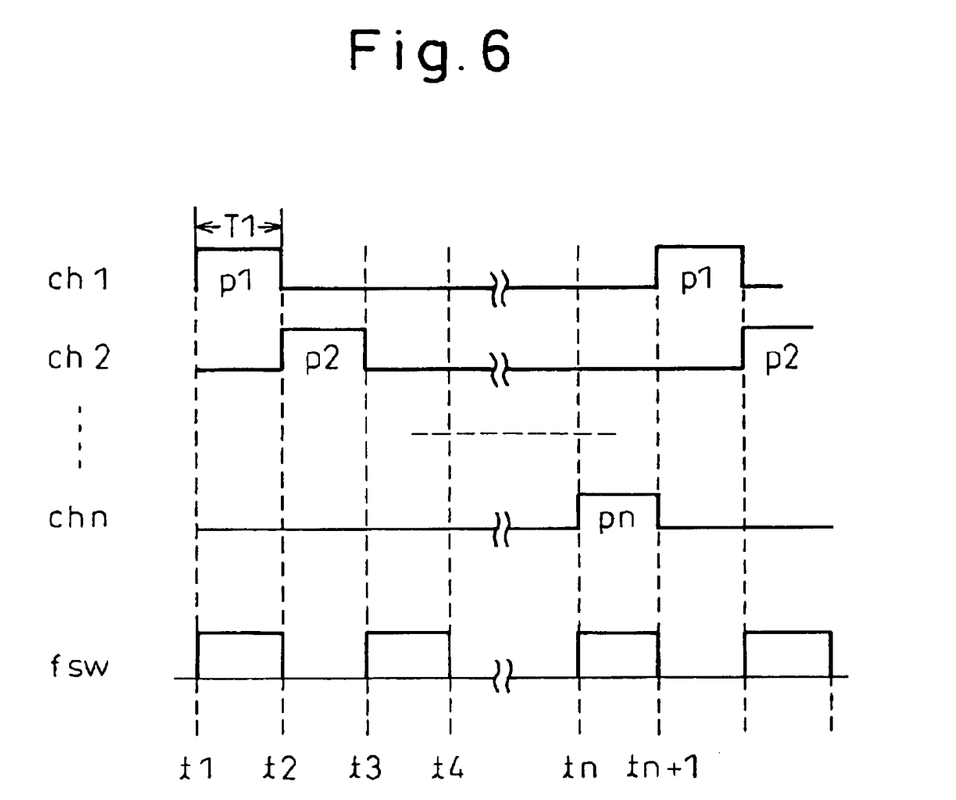
FIG. 6 is a diagram showing a signal output from a switching signal generator and a waveform for explaining antenna switching operation.

Connection switching is performed using the signal output from the switching signal generator 46. As shown in FIG. 6, this switching signal is a clock signal of frequency fsw, and channel switching occurs at each of the rising and falling edges of the switching signal with the frequency of fsw, as shown by p1 to pn on ch1 to chn. With this switching, ch1 is selected during p1 (time t1 to t2), ch2 is selected during p2 (time t2 to t3), and in like manner chn is selected during pn (time tn to tn+1) in sequence for connection to the amplifier 41. The time interval of each of the periods p1 to pn is the same, i.e., T1, and the channels are switched one after another with the period T1, as shown in FIG. 6.

Figure 7:
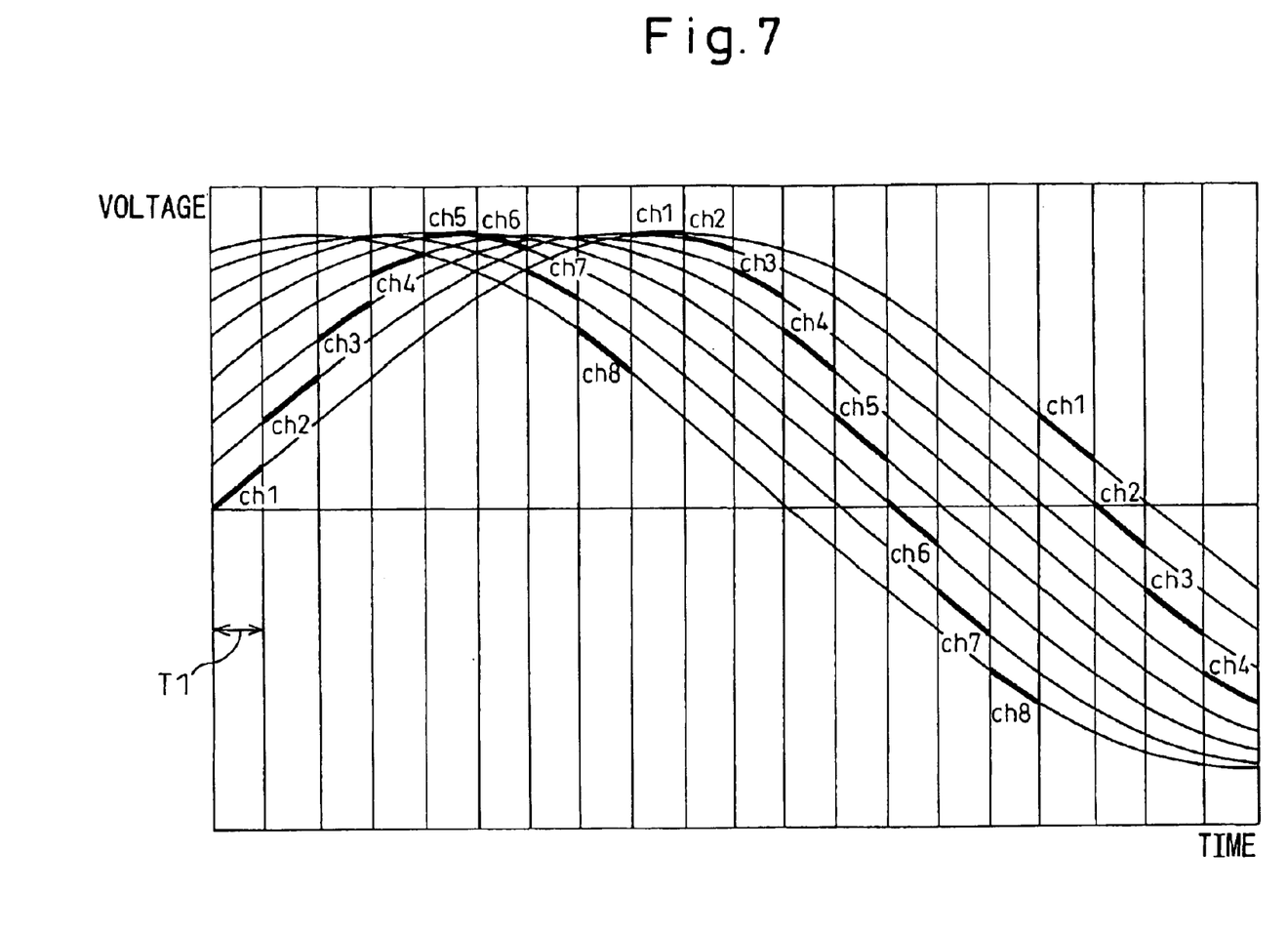
FIG. 7 is a diagram showing the waveforms of downconverted signals.

The waveforms of the signals downconverted by the mixer 42 are shown in FIG. 7. In FIG. 7, the time is plotted along the abscissa and the voltage along the ordinate. Vertical lines are drawn with a spacing equal to the channel switching period T1 with which the selector switch performs switching. The figure shows the case where the number of receive channels n=8; as shown, the phases of the beat signals received from the respective channels ch1 to ch8 are slightly shifted from each other. The eight curves show the beat signals produced by downconverting the signals received on the respective channels. In this embodiment, as the channel switching is performed with the period T1 based on the signal output from the switching signal generator 46, the beat signals output from the mixer 42 have the waveforms shown by thick lines in FIG. 7. Each beat signal is passed through the amplifier 43 and the filter 44 and input to the A/D converter 45. In the A/D converter 45, the beat signal is converted into a digital signal which is supplied to the digital signal processor (DSP) 5. In the DSP, phase shifting (PH-SFT) is applied to the digital signal from each channel, and all the channels are combined.

Embodiment 1

Figure 8:
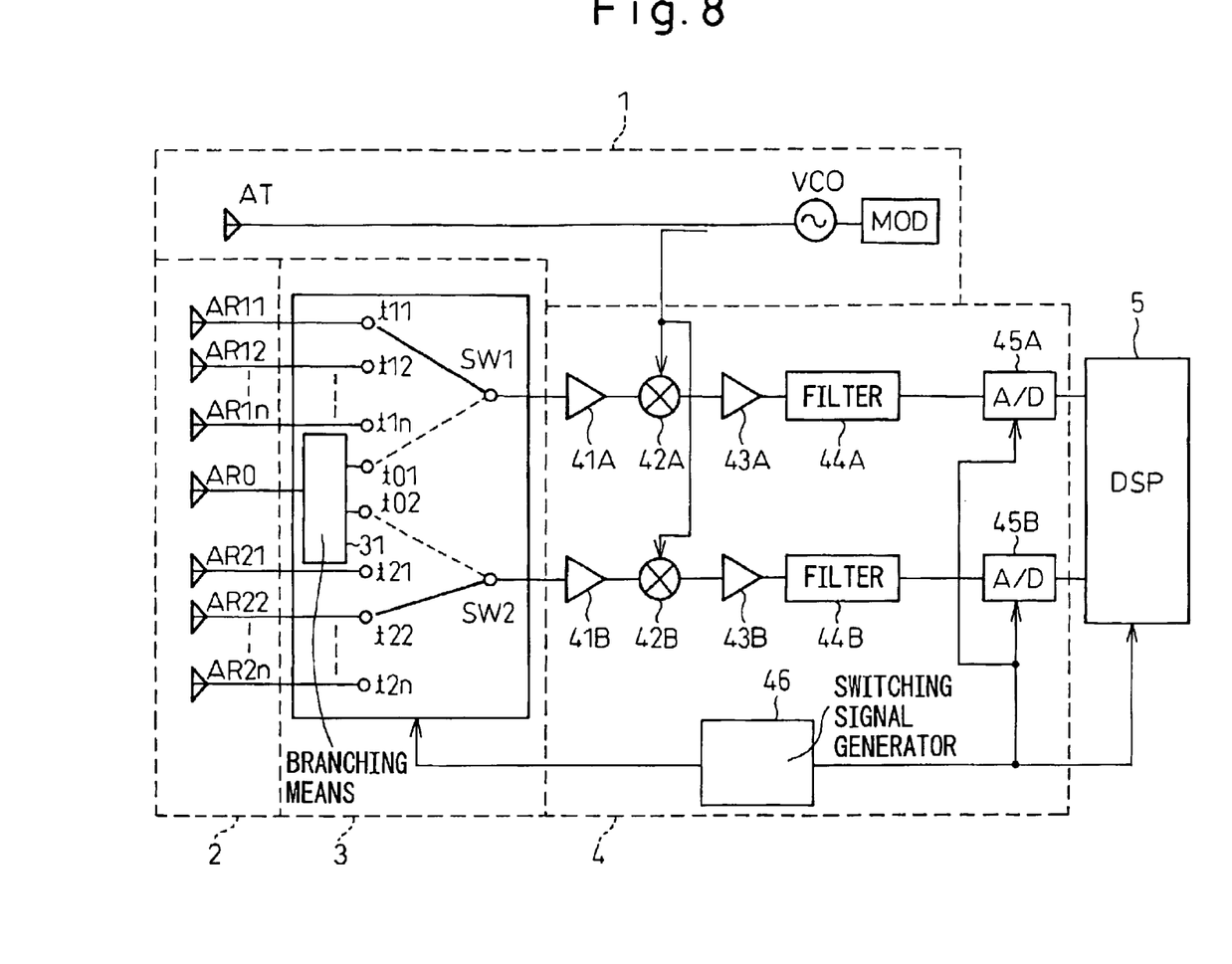
FIG. 8 is a diagram showing an embodiment of a radar apparatus according to the present invention.

FIG. 8 shows an embodiment of the radar apparatus of the present invention. This radar apparatus differs from the radar apparatus of FIG. 5 in that a plurality of channels each having a downconverting section are provided in the receiver section 4, with provisions made to share at least one of the plurality of antennas between the plurality of channels.

In FIG. 8, two downconverting sections are provided, and reference numeral 1 indicates the transmitter section, 2 the antenna section, 3 the selector switch section, 4 the receiver section, and 5 the digital signal processing section (DSP). In the transmitter section 1, the modulating signal generator MOD applies a modulating signal to the voltage-controlled oscillator VCO for frequency modulation, and the frequency-modulated wave of f0±Δf/2 is transmitted out from the transmitting antenna AT, while a portion of the transmitted signal is separated and fed into mixers 42A and 42B in the receiver section 4. Signals reflected from objects are received by the plurality of receiving antennas in the antenna section 2, and the received signals from the respective receiving antennas are fed via the selector switch section 3 into the receiver section 4.

The receiving antennas are divided into two groups, group A consisting of n receiving antennas AR11 to AR1n and group B consisting of n receiving antennas AR21 to AR2n. The antenna section 2 further includes a common antenna AR0 connected to a branching means hereinafter described.

The selector switch section 3 includes output terminals t11 to t1n of the antennas in the group A, output terminals t21 to t2n of the antennas in the group B, and terminals t01 and t02 of the branching means 31. SW1 is a selector switch for the group A, by which the connection to the terminals t11 to t1n and t01 is sequentially switched with a prescribed period to sequentially input the received signals from the respective antennas AR11 to AR1n and the common antenna AR0 into the receiver section. Likewise, SW2 is a selector switch for group B, by which the connection to the terminals t21 to t2n and t02 is sequentially switched with a prescribed period to sequentially input the received signals from the respective antennas AR21 to AR2n and the common antenna AR0 into the receiver section.

Figure 9:
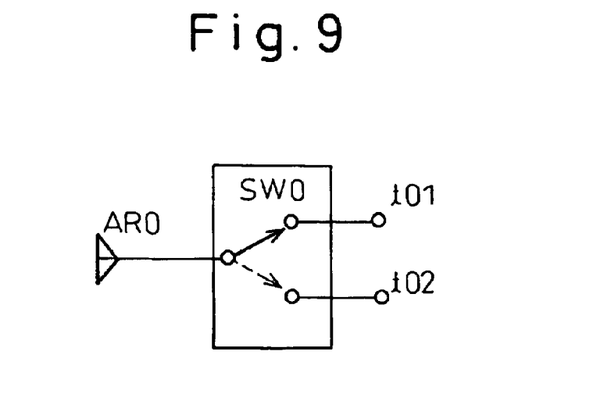
FIG. 9 is a diagram showing the configuration of a branching means.

The branching means 31, as shown in FIG. 9, includes a selector switch SW0 by which the output of the common antenna AR0 is switched between the terminal t01 and the terminal t02. Alternatively, a hybrid circuit may be used as the branching means.

On the other hand, the receiver section 4 comprises two channels: channel A includes an amplifier 41A, a mixer 42A as a downconverter, an amplifier 43A, a filter 44A, and an A/D converter 45A, and channel B includes an amplifier 41B, a mixer 42B as a downconverter, an amplifier 43B, a filter 44B, and an A/D converter 45B.

In FIG. 8, the number of channels is 2, but three or more channels may be provided. In that case, the receiving antennas are divided into the same number of groups as there are channels, and the number of common antennas and branching means is increased as the number of channels increases.

The received signals input from the antennas AR11 to AR1n and the common antenna AR0 in the antenna section 2 are sequentially and selectively switched by SW1 for input to the channel A in the receiver section 4, and likewise, the received signals input from the antennas AR21 to AR2n and the common antenna AR0 are sequentially and selectively switched by SW2 for input to the channel B in the receiver section 4.

The switching operations of SW1 and SW2 are controlled by the clock signal of frequency fsw shown, for example, in FIG. 6, that is output from the switching signal generator 46. Switching from one antenna to the next occurs at each of the rising and falling edges of the clock signal, that is, the channel switching is performed with the period T1.

The signal output from the amplifier 41A is fed into the mixer 42A acting as the downconverter, where the signal is downconverted by being mixed with the output signal of the voltage-controlled oscillator VCO, and a beat signal is thus produced. The waveform of the downconverted signal is the same as that shown in FIG. 7. The beat signal whose waveform is shown by a thick line in FIG. 7 is then passed through the amplifier 43A and the filter 44A and input to the A/D converter 45A. In the A/D converter 45A, the beat signal is converted into a digital signal which is supplied to the digital signal processor (DPS) 5.

The received signals input from the antennas AR21 to AR2n and the common antenna AR0 in the antenna section 2 are sequentially and selectively switched by SW2 for input to the channel B in the receiver section 4. The remainder of the operation is the same as that described for the channel A.

As shown in FIG. 8, of the plurality of antennas, the common antenna AR0 is shared between the two channels A and B each having a downconverter. In the embodiment of FIG. 8, one antenna is shared, but two or more antennas may be shared.

Next, the operation of the embodiment of the present invention shown in FIG. 8 will be described. The received signal obtained via the switch SW1 is downconverted and A/D converted on the channel A and input to the DSP 5 for processing. Likewise, the received signal fed via the switch SW2 is downconverted and A/D converted on the channel B and input to the DSP 5 for processing.

In a radar apparatus, the characteristics of the mixers, etc. vary depending on the surrounding environment such as temperature, and an accurate measurement may not be accomplished. According to the present invention, since corrections are applied in such cases, the accuracy of measurement can be enhanced.

Figure 10:
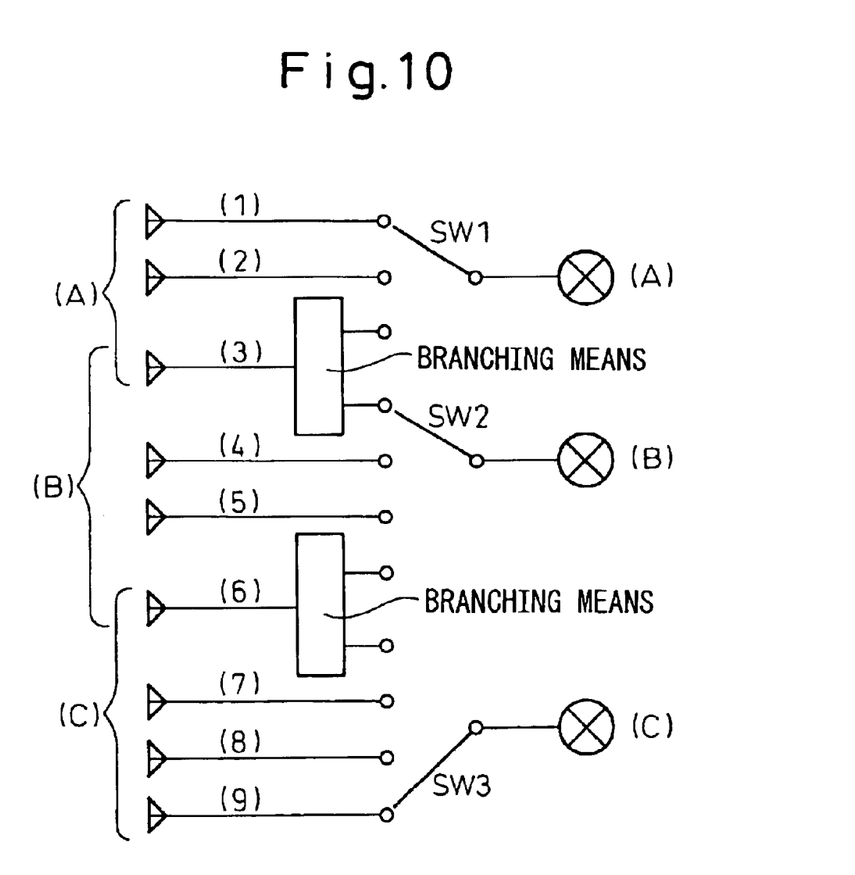
FIG. 10 is a diagram showing a radar apparatus according to the present invention for the case where the number of channels is 3.
Figure 11A:
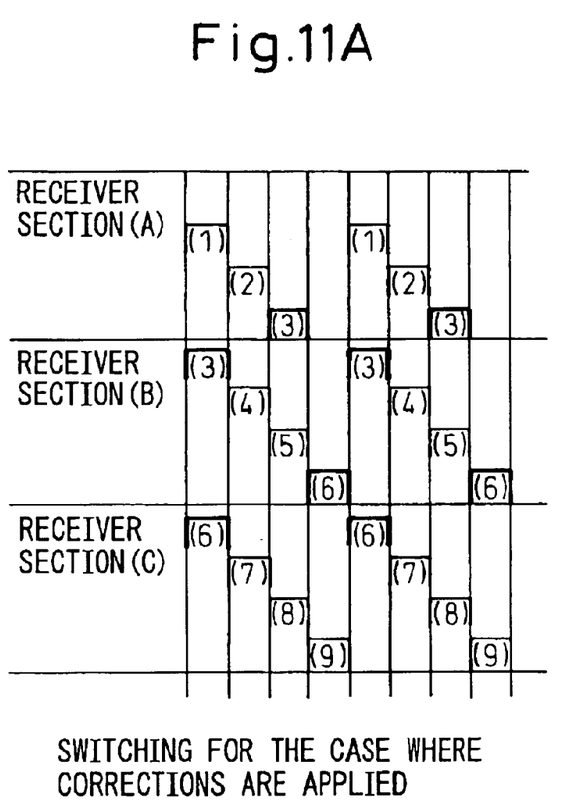
FIGS. 11A and 11B are diagrams for explaining how corrections are applied.
Figure 11B:
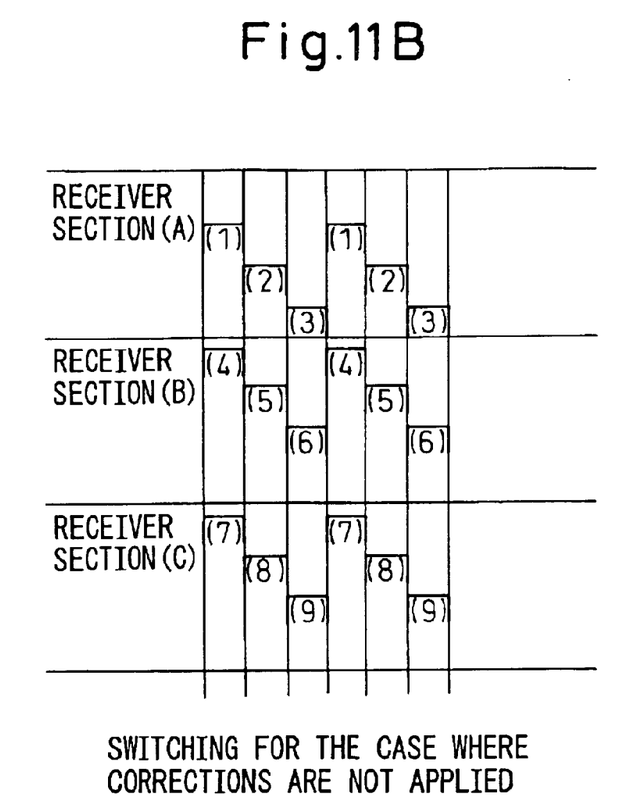

Referring to FIG. 10 and FIGS. 11A and 11B, a description will be given, below, of how corrections are applied in the radar apparatus of the present invention. FIG. 10 shows the case where the number of channels is 3 in the radar apparatus of the present invention. Antennas (1) to (9) are divided into three groups (A), (B), and (C), and the receiver section comprises three channels (A), (B), and (C). In the figure, the number of antennas in each group is three or four, but the invention is not limited to this particular number.

FIGS. 11A and 11B show how corrections are applied. FIG. 11A shows the received signals fed via the switches SW1 to SW3 to the respective channels (A), (B), and (C) for the case where corrections are applied. As shown in FIG. 11A, the received signals from the antennas (1) to (3) are input to the channel (A), the received signals from the antennas (3) to (6) are input to the channel (B), and the received signals from the antennas (6) to (9) are input to the channel (C).

Here, the received signal from the antenna (3) is input to both the channels (A) and (B), and the received signal from the antenna (6) is input to both the channels (B) and (C).

When a designated one of the plurality of antennas is shared between each of the plurality of channels as shown above, correlations of the phase and amplitude characteristics between the respective channels can be obtained by producing beat signals on different channels for the same received signal, and corrections can be applied based on the correlations. As a result, the accuracy of measurement does not degrade even when the surrounding environment changes.

On the other hand, FIG. 11B shows the received signals fed via the switches SW1 to SW3 to the respective channels (A), (B), and (C) for the case where corrections are not applied. As shown in FIG. 11B, no antennas are shared between the respective channels.

Since, usually, the surrounding environment changes sufficiently slowly compared with the observation time, data collection for inter-channel corrections need not be performed for each observation. Accordingly, corrections can be applied when a temperature change is detected, or at predetermined intervals of time.

When only one channel comprising the downconverter mixer, etc. is provided for the plurality of antenna arrays as in the configuration of FIG. 5, switching must be performed at high speed within the measuring sector so as not to disrupt the correlation between the respective antenna arrays, and the resulting signals are as shown in FIG. 7. If each signal waveform resulting from such high-speed switching is to be faithfully input to the A/D converter, the bandwidth becomes much wider than the actual beat signal bandwidth, and this can result in a degradation of the S/N ratio.

A method for reducing the number of channels to be switched within one data acquisition sector (measuring sector) for the same number of antenna arrays is disclosed, for example, in Publication of Japanese Unexamined Patent Application No. 11-31168. In this case, after first setting the reference channel, combinations must be considered, and processing for synthesis must be performed using data from a plurality of sectors (a plurality of FMs).

When applications as automotive radars are considered, there are many target objects having large level variations and large relative velocity, and it is difficult to ensure simultaneity; besides, problems associated with measurement errors or sensitivity are highly likely to occur. Even in applications where such problems do not occur, if the number of observation sectors can be reduced, the number of detection results (detected information) that can be obtained within the total observation time increases; as a result, it becomes possible to apply processing such as averaging, and this serves to enhance the detection accuracy and sensitivity.

However, if the number of channels is simply increased (for example, the configuration of FIG. 4), the system becomes more susceptible to changes in the surrounding environment because of the temperature and frequency characteristics of the mixer, etc. provided in each channel, and the accuracy degrades as the phase and amplitude relations between the respective channels change. To solve this problem, in the present invention, one antenna array is shared between a plurality of channels, and beat signals are produced on different channels for the same received signal, based on the analysis results of which the correlations of the phase and amplitude characteristics between the respective receive channels are obtained; this configuration serves to prevent accuracy degradation even when the surrounding environment changes.

What is claimed is:

1. A radar apparatus which radiates a transmit signal from a transmitter section, and which receives said transmit signal reflected from an object by switching between a plurality of antennas, wherein said plurality of antennas are divided into a plurality of groups, and at least one of the plurality of antennas contained in each of said groups is a common antenna, and wherein said radar apparatus comprises: a selector switch section having a plurality of selector switches each for sequentially and selectively switching output terminals of said plurality of antennas and said common antenna contained in a corresponding one of said groups for connection to an input terminal; a plurality of channels each having an A/D converter and a downconverting section for downconverting a received signal that has been input from each of said antennas to said input terminal via a corresponding one of said plurality of selector switches; and a digital signal processing section for receiving an output from said A/D converter of each of said channels, and for applying prescribed processing to detect the distance to or the relative velocity of said object.

2. A radar apparatus as claimed in claim 1, wherein said common antenna is provided with a branching means for connecting the output of said common antenna to each of said channels by switching therebetween.

3. A radar apparatus as claimed in claim 2, wherein said branching means is a selector switch.

4. A radar apparatus as claimed in claim 2, wherein said branching means is a hybrid circuit.

* * * * *